United States Patent [19]

Baer et al.

[11] 4,117,511
[45] Sep. 26, 1978

[54] UNIVERSAL TELEVISION INTERFACE AND SYNC GENERATOR THEREFOR

[75] Inventors: Ralph H. Baer, Manchester; Leonard D. Cope, Merrimack, both of N.H.

[73] Assignee: Sanders Associates, Inc., Nashua, N.H.

[21] Appl. No.: 817,642

[22] Filed: Jul. 21, 1977

[51] Int. Cl.² .................. H04N 5/06; H04N 5/50
[52] U.S. Cl. .................. 358/83; 358/93; 358/142; 358/148; 358/150; 358/192
[58] Field of Search ............ 358/142, 146, 148, 149, 358/150, 93, 83, 192

[56] References Cited
U.S. PATENT DOCUMENTS

3,728,480  4/1973  Baer .................. 358/93

Primary Examiner—Robert L. Richardson
Attorney, Agent, or Firm—Louis Etlinger; Richard I. Seligman

[57] ABSTRACT

Apparatus for generating horizontal and vertical synchronization signals in synchronism with synchronization signals generated by an ongoing television program received by a user without internal connections to the user's television receiver, is provided by optically extracting pulses from a displayed raster of the ongoing television program and generating therefrom the synchronization signals in synchronization with the ongoing program.

13 Claims, 11 Drawing Figures

UNIVERSAL TELEVISION INTERFACE AND SYNC GENERATOR THEREFOR

BACKGROUND OF THE INVENTION

Presently, television receivers are being manufactured which incorporate therein means for displaying pictorial content in addition to that which is received from a broadcast studio or through a closed circuit or CATV cable system or from a video playback unit. These auxiliary presentations include items such as channel number and time of day. Since the use of these auxiliary presentations is relatively new in the art, most television receivers do not have equipment built in to provide such presentations. Thus, there are more than one hundred million television receivers in the United States alone which cannot display these auxiliary presentations such as time of day, channel number and the like.

There is disclosed in U.S. Pat. No. 3,728,480 which issued on Apr. 17, 1973 which is incorporated herein by reference, apparatus for displaying additional information in conjunction with information originating from a cooperative station such as a broadcast station, closed circuit television system, or a CATV network. In this patent, horizontal and vertical synchronization signals are extracted from the television receiver by employing a device in front of the receiver and attached thereto, by, for example, a suction cup. This device includes a pick-up coil which extracts the magnetic field from the horizontal deflection circuits which operate in step with the received synchronization signals and a photocell which is used to pick up a sixty Hertz signal component provided by a white rectangle or stripe at the bottom of the cathode ray tube of the receiver which would be broadcast by the cooperative station. This method is not entirely satisfactory in that the inductive coupling of the horizontal signal from a coil located on the cathode ray tube face is relatively weak and the disclosed use of a photocell to generate a vertical synchronization signal necessitates that the cooperative station generate a white marker at the vertical synchronization rate.

U.S. Pat. No. 3,728,480 also discloses what is referred to therein as a crowbar modulation circuit for overlaying auxiliary information on top of the information generated by the cooperative station. However, practical application of the techniques were never commercially employed because to date television stations have not generated the necessary information to allow the external extraction of synchronization signals in the manner described above.

SUMMARY OF THE INVENTION

Accordingly, it is an object of this invention to provide improved means for generating synchronization signals in synchronization with those of a program received by a television receiver without making connections to the internal circuitry of the television receiver other than those reached via the antenna terminals.

It is another object of this invention to provide improved means for overlaying information on the screen of a television receiver in conjunction with information received from another TV r.f. transmission source.

It is a further object of this invention to provide means for generating synchronization signals in synchronism with those of a program received by a television receiver without cooperation from the generator of such program.

In order to achieve these objects, the user causes a portion of the screen of a television receiver displaying an ongoing received program to be white. A phototransistor is placed adjacent to the screen to provide a number of pulses from the television raster at the horizontal synchronization signal rate of the ongoing program. A horizontal synchronization phase locked loop circuit is coupled to the phototransistor to generate continual pulses at the horizontal synchronization rate. These pulses are applied to a horizontal video synchronization regenerating circuit to properly synchronize the generated pulses with the horizontal synchronization signals of the ongoing program. A vertical synchronization phase locked loop circuit is also coupled to the phototransistor to generate pulses at the vertical synchronization rate. These pulses are applied to a vertical video synchronization regenerating circuit to properly synchronize the generated pulses with the vertical synchronization signals of the ongoing program. Auxiliary presentations superimposed on an ongoing television program are provided in synchronism with the received presentation by employing the generated synchronization signals, and using a crowbar r.f. modulating technique to impress the new video information onto the transmitted, modulated r.f. (TV) carrier signal.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
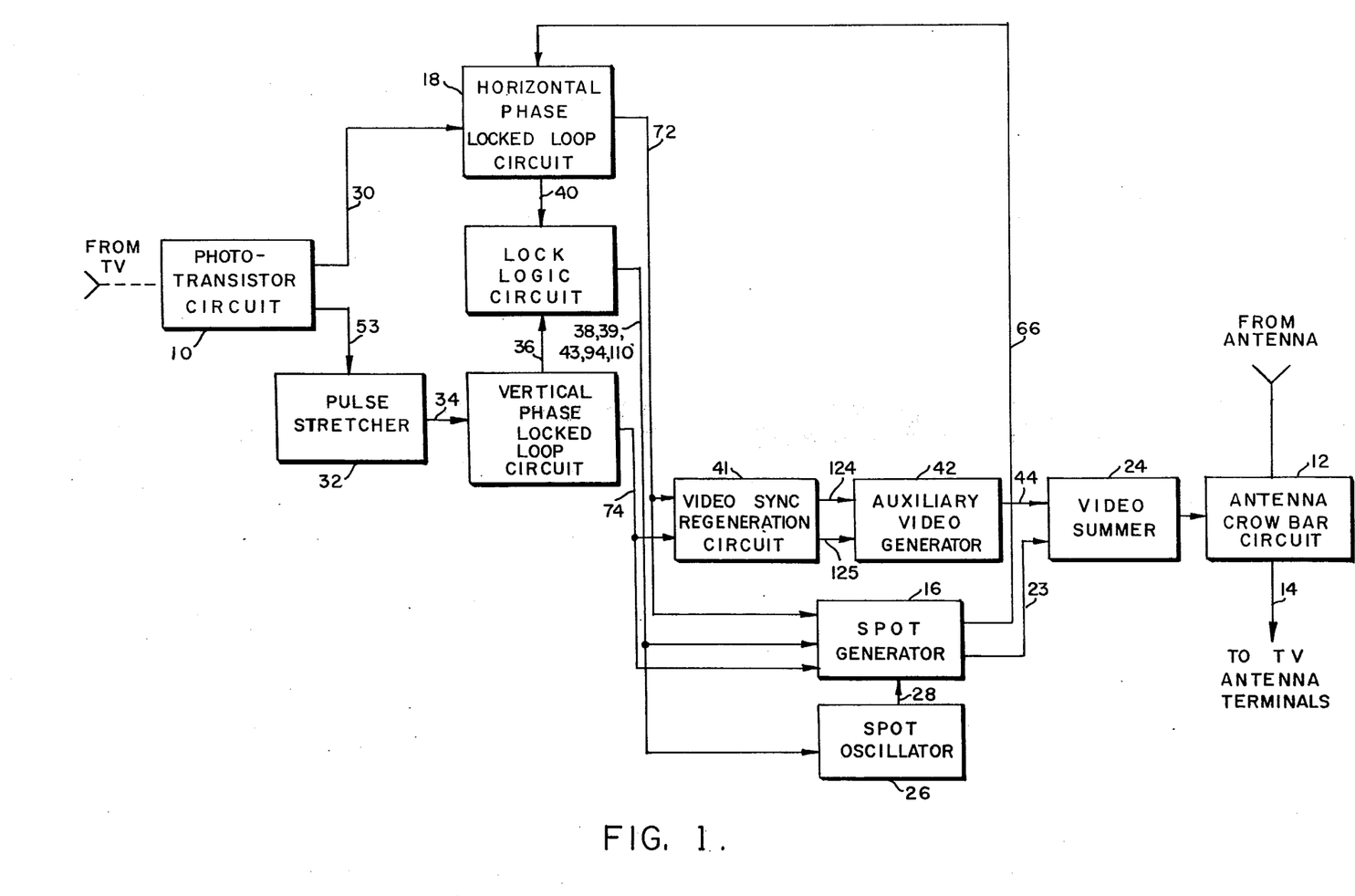
FIG. 1 is a system block diagram of a universal television interface.

Referring now to FIG. 1 of the drawings, there is illustrated thereby a preferred embodiment of the invention. In order to obtain synchronization signals from an ongoing program, the user affixes a phototransistor circuit 10 to the surface of the screen of the television receiver. The lead from the antenna which is normally applied to the antenna terminals of the television receiver is instead applied to an antenna crowbar circuit 12 and the output 14 therefrom is instead attached to the antenna terminals of the receiver. The user then selects the station of his choice for viewing. The lock-on sequence for the universal I.V. interface is as follows:

A spot generator 16, which receives inputs from a horizontal phase locked loop circuit 18, a vertical phase locked loop circuit 20 and a lock logic circuit 22, provides a signal 23 which is synchronous with the horizontal and vertical phase locked loops. Signal 23 is applied via a video summer circuit 24 to the antenna crowbar circuit 12 causing a spot to appear on the screen of the television receiver. In this embodiment the spot displayed preferably occupies approximately one quarter of the area of the television receiver screen. Since at this point lock-on has not occured, the spot will precess across the screen and, thus, across the phototransistor circuit 10. Spot oscillator 26, which has an input from the lock logic circuit 22, provides a signal 28 to spot generator 16 which causes the displayed spot to be serrated every 0.5 microseconds. This prevents the spot from masking the synchronization signals of the broadcast program as the spot precesses across the television screen.

An output 30 from the phototransistor circuit 10 is applied to the horizontal phase locked loop 18 and an output 53 to the vertical phase locked loop 20 via a pulse stretcher 32. The outputs from phototransistor circuit 10 are a series of pulses, one pulse for each line of the displayed spot that is sensed by the phototransistor. These pulses are present only when the raster is in the viewing field of the phototransistor.

Therefore, the horizontal phase locked loop circuit 18 is enabled by spot generator 16 only when the spot is generated. Horizontal phase locked loop 18 locks onto the signal 30. This signal is repeated each video field. The signal 53 applied to vertical phase locked loop 20 is transformed to a single pulse by pulse stretcher 32. This single pulse output 34 of pulse stretcher 32 is applied to the vertical phase locked loop circuit 20 which locks on to the signal 34.

A signal 36 from the vertical phase locked loop circuit 20 informs the lock logic circuit 22 that the vertical phase locked loop has achieved lock and an output signal 38 from the lock logic circuit 22 instructs spot generator 16 to reduce the height of the spot to an unobtrusive size. Likewise a signal 40 from the horizontal phase locked loop circuit 18 informs the lock logic circuit 22 that the horizontal phase locked loop has achieved lock and an output signal 39 from the lock logic circuit 22 instructs the spot generator 16 to reduce the width of the spot to an unobtrusivve size. These circuits, thus, shrink the large white spot which occupied approximately one quarter of the screen of the television receiver to a small rectangular spot located immediately opposite the phototransistor. This constitutes horizontal and vertical lock.

After horizontal and vertical lock has occurred, spot oscillator 26 is disabled by a signal 43 from lock logic circuit 22 to increase the stability of the locks.

Two outputs 72 and 74 from the phase locked loops 18 and 20 are employed to regenerate horizontal and vertical synchronization signals. Signals 72 and 74 are fed to an auxiliary video generator 42 via a video synchronization regeneration circuit 41. The auxiliary video generator 42 is used to provide the auxiliary presentation on the screen of the television receiver in conjunction with other presentations from a broadcast, closed circuit or CATV station or video recorder and in synchronization therewith. An output 44 from auxiliary video generator 42, which is now in synchronizism with the ongoing program, is applied to video summer 24 along with the output 23 from spot generator 16.

A typical presentation by auxiliary video generator 42 is a clock for providing the time of day and a standard integrated circuit can be used to provide such a display. The output of the video summer 24 is applied to the television receiver antenna crowbar circuit 12 and displays digital time of day on top of the ongoing program.

FIGS. 2-11 of the drawings illustrates in greater detail the circuits for the various blocks indicated in FIG. 1.

Figure 2:
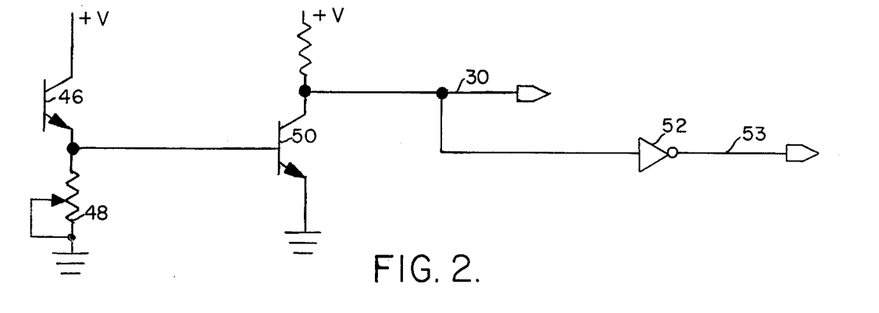
FIG. 2 is a schematic diagram of a phototransistor circuit employed in the embodiment of FIG. 1.

Phototransistor circuit 10 is shown in greater detail in FIG. 2 and comprises a phototransistor 46 having a potentiometer 48 in the emitter circuit thereof to adjust the sensitivity of the phototransistor. The output from phototransistor 46 is applied to an amplifier 50. The output pulses of amplifier 50 provide the signal 30. These pulses are inverted by an inverter 52 to supply the signal 53.

Figure 3:
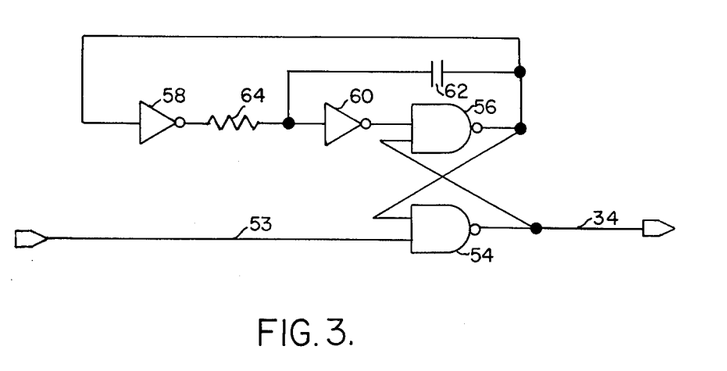
FIG. 3 is a schematic diagram of a pulse stretching circuit employed in the embodiment of FIG. 1.

A typical pulse stretching circuit which may be used for the pulse stretcher 32 of FIG. 1 is shown in FIG. 3 of the drawings. In this circuit, the signal 53 from the phototransistor circuit 10 is applied to one input of a NAND gate 54. This circuit also includes a second NAND gate 56, the output from which is applied to another input to NAND gate 54, as well as to an inverter 58. The output of inverter 58 is coupled to a second inverter 60 through a resistor 64 which is connected to the output of NAND gate 56. The output of inverter 60 is coupled to an input of NAND gate 56 via a capacitor 62. The output 34 of NAND gate 54 is connected to an input to NAND gate 56 and to vertical phase locked loop 20. The multiple pulsed signal 53 applied to pulse stretcher 32 is converted at the output of NAND gate 54 to a single pulse typically having a width of 5 milliseconds.

Figure 4:
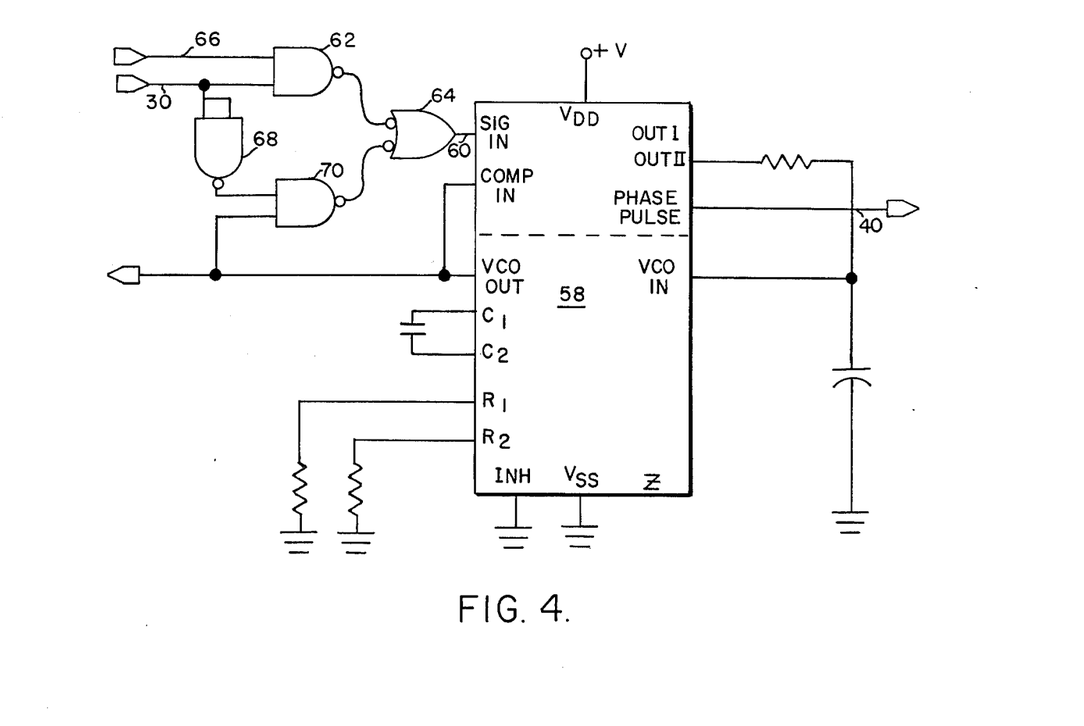
FIG. 4 is a schematic diagram of a horizontal phase locked loop circuit employed in the embodiment of FIG. 1.

One embodiment for horizontal phase locked loop circuit 18 is shown in FIG. 4 of the drawings. This circuit is comprised of a standard integrated circuit 58, typically an RCA CD4046AE integrated circuit. signal 30 from phototransistor circuit 10 is applied to horizontal phase locked loop 18 at a NAND gate 62, the output from which is applied to an OR gate 64. An enable signal 66 from spot generator 16 is applied as the second input to NAND gate 62 and likewise to both inputs of a NAND gate 68, the output of which is applied to another NAND gate 70. The output from NAND gate 70 is applied to OR gate 64. These gates allow signal 30 to enable or disable the phase locked loop. A second input of NAND gate 70 is coupled to the voltage controlled oscillator which also provides an output 72. A second output from the voltage controlled oscillator 58 is taken at the phase pulse output thereof to provide signal 40 which is applied to lock logic circuit 22.

Figure 5:
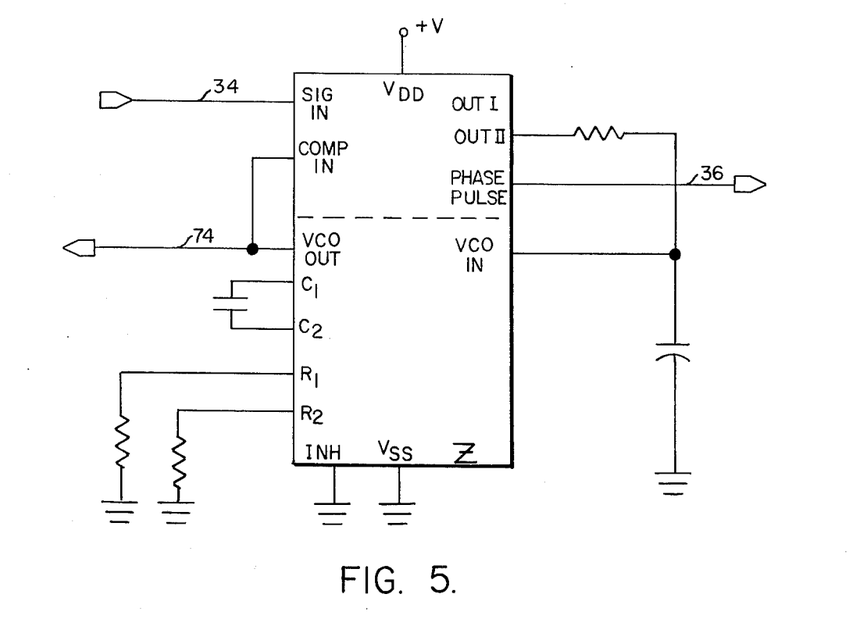
FIG. 5 is a schematic diagram of a vertical phase locked loop circuit employed in the embodiment of FIG. 1.

Vertical phase locked loop circuit 20 illustrated in FIG. 5 also employs a standard integrated circuit and again typically an RCA CD4046AE. The input thereto is signal 34 and one output is signal 74 which is applied to spot generator 16. A second output is the phase pulse signal 76 applied to lock circuit 22.

Figure 6:
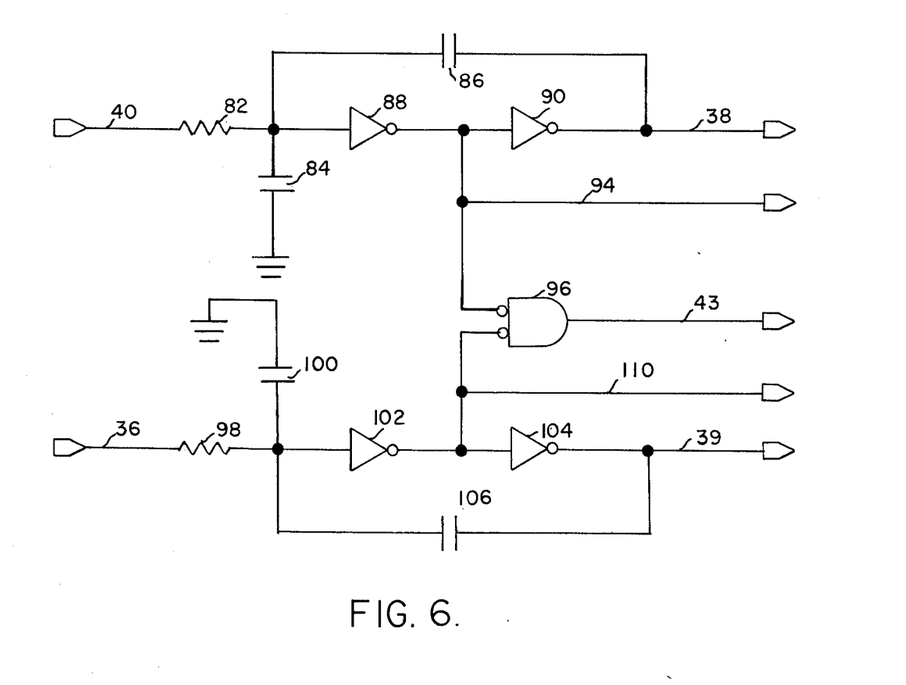
FIG. 6 is a schematic diagram of a lock logic circuit employed in the embodiment of FIG. 1.

The lock logic circuit 22 is illustrated in greater detail in FIG. 6. Signal 40 from the horizontal phase locked loop circuit 18 is applied to a node 80 via a resistor 82. Node 80 is connected to ground via a capacitor 84, to a second capacitor 86 and to an inverter 88. The output of inverter 88 is coupled to a second inverter 90, the output from which provides a horizontal lock signal 38 and is also connected to capacitor 86. The output of inverter 88 provides a not horizontal lock output signal 94 and is also applied to an AND gate 96.

The portion of the lock logic circuit 22 for the vertical portion of the signal is constructed identically with that of the horizontal portion and comprises a resistor 98, capacitor 100, inverters 102 and 104 and a capacitor 106. The vertical lock signal 39 is taken at the output of the inverter 104 and the not vertical lock signal 110 is taken at the output of inverter 102. Like the horizontal portion of the circuit, the output of inverter 102 is applied to AND gate 96 as a second input thereto. The output of AND gate 96 comprises the lock signal 43.

Figures 7, 9:
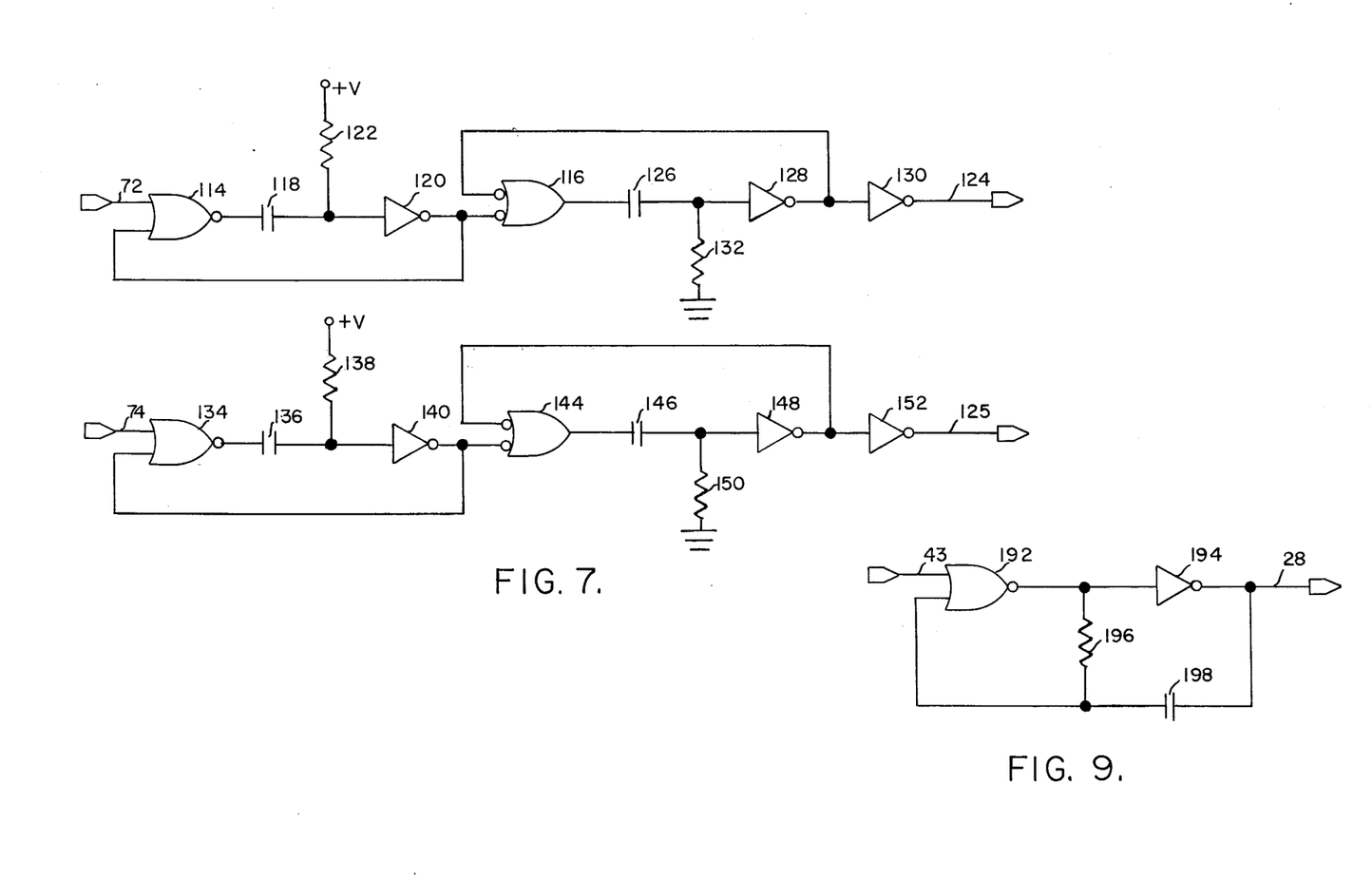
FIG. 7 is a schematic diagram of a video synchronization regeneration circuit employed in the embodiment of FIG. 1.
FIG. 9 is a schematic diagram of a spot oscillator employed in the embodiment of FIG. 1.

Video synchronization regeneration circuit 41 is illustrated schematically in FIG. 7 of the drawings. The horizontal portion thereof comprises a NOR gate 114, the output from which is applied to an OR gate 116, via a capacitor 118 and an inverter 120. Supply voltage for this part of the circuit is supplied via a resistor 122 connected between capacitor 118 and inverter 120. One input to NOR gate 114 is coupled to the output of inverter 120. The output of OR gate 116 provides the horizontal synchronization signal 124 via a capacitor 126 and inverters 128 and 130. The output of inverter 128 is fed back and applied as a second input to OR Gate 116. A resistor connecting capacitor 126 and inverter 128 is connected to ground. The input to this circuit is signal 72 from horizontal phase locked loop 18 applied to NOR gate 114. The vertical portion of the video synchronization regeneration circuit is constructed similiarly to the horizontal portion and comprises a NOR gate 134, capacitor 136, inverter 140, OR gate 144, capacitor 146, inverter 148, resistor 150 and inverter 152 and supplies the vertical synchronization signal 125.

Figure 8:
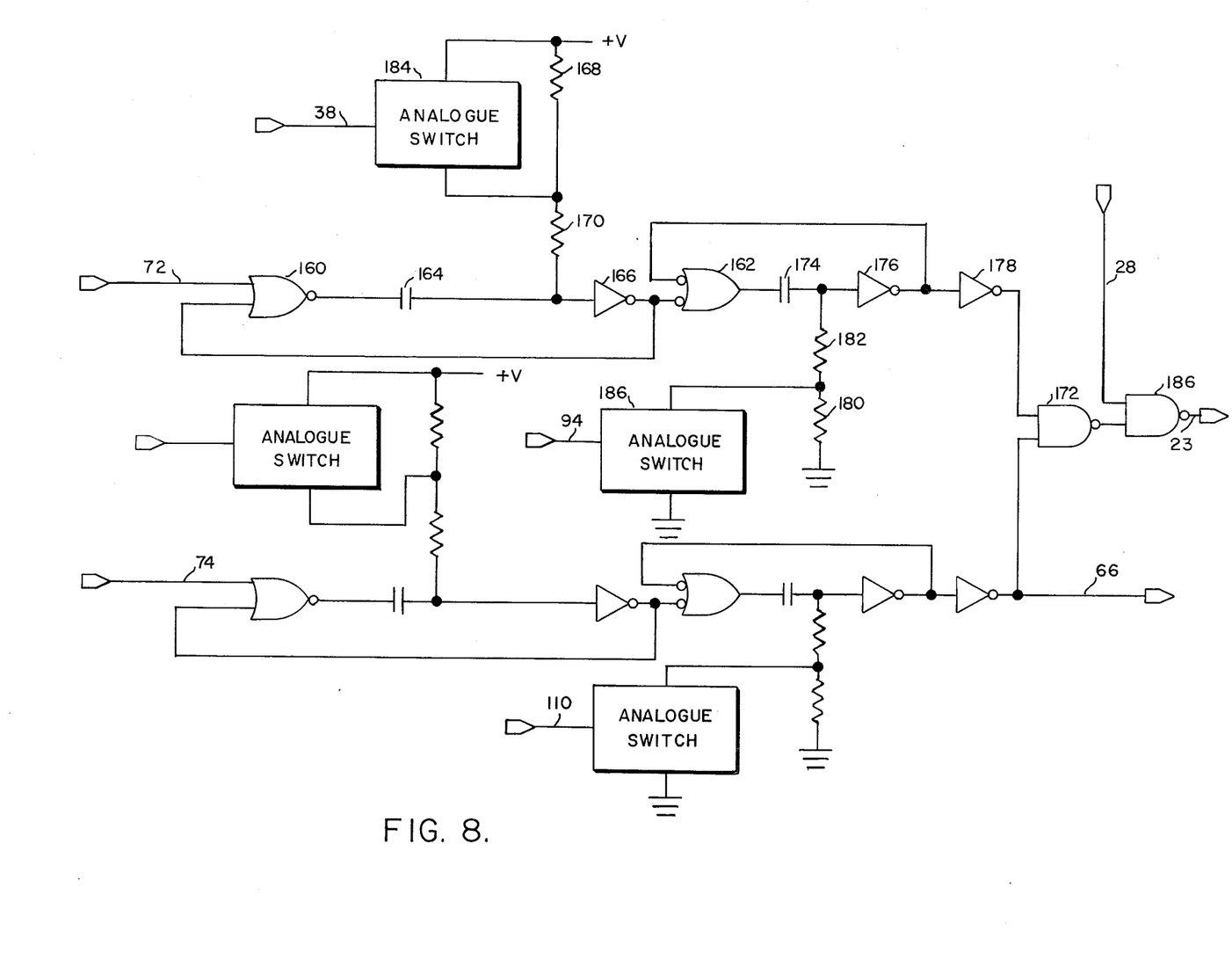
FIG. 8 is a schematic diagram of a spot generator employed in the embodiment of FIG. 1.

A typical spot generator 16 for the universal television interface is shown schematically in FIG. 8 of the drawings. Signal 72 from the horizontal phase locked loop 18 is applied to the horizontal portion of the spot generator as one input to a NOR gate 160. The output of NOR gate 160 is coupled to one input of an OR gate 162 via a capacitor 164 and an inverter 166. The second input to NOR gate 160 is coupled from the output of inverter 166. Supply voltage is applied at the junction of capacitor 164 and inverter 166 by way of a pair of series resistors 168 and 170. The output of OR gate 162 is coupled to a NAND gate 172 via a capacitor 174 and inverters 176 and 178. A second input to OR gate 162 is derived from the output of inverter 176. The junction of capacitor 174 and inverter 176 is coupled to ground via a pair of resistors 180 and 182.

Resistors 168 and 180 are shunted by a pair of analogue switches 184 and 186 which are operated by the signals 38 and 94 from lock logic circuit 22 of FIG. 1. When lock has occured these switches short the resistors 168 and 180 thereby decreasing the displayed spot size as mentioned hereinbefore. Typically, analogue switches 184 and 186 are RCA CD4016 integrated circuits.

The vertical portion of the spot generator is constructed in similar fashion to that of the horizontal portion. The input thereto is signal 74 from vertical phase locked loop circuit 20. The output of the vertical portion is coupled to NAND gate 172. The output of NAND gate 172 is applied to a NAND gate 186 which has as a second input thereto the output 28 from spot oscillator 26. The output from the vertical portion of the spot generator also provides on line 66 the enable signal applied to the horizontal phase locked loop 18.

A typical spot oscillator is illustrated in FIG. 9 of the drawings and comprises a NOR gate 192 and an inverter 194 with a resistor coupled to the connection between NOR gate 192 and inverter 194. The other end of resistor 96 is connected to the output of inverter 194 via a capacitor 198. This end of the resistor is also coupled to a second input to NOR gate 192. The frequency of the output of this oscillator is typically on the order of two megahertz. The input signal applied thereto is the lock signal 43 from lock logic circuit 22 of FIG. 1.

Figure 10:
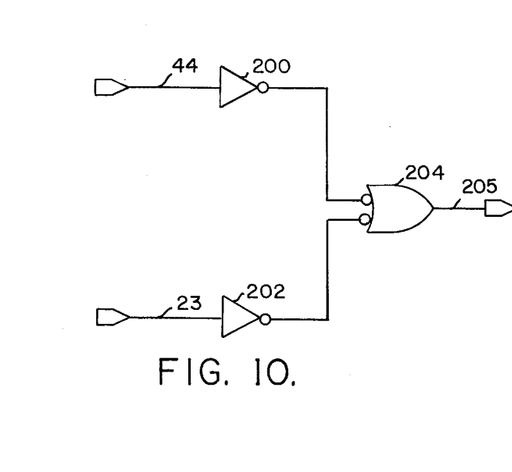
FIG. 10 is a schematic diagram of a video summer employed in the embodiment of FIG. 1.

A typical video summer is shown in FIG. 10 and comprises a pair of inverters 200 and 202 receiving as signals thereto the output 44 of auxiliary video circuit 42 and the output 23 of spot generator 16. The outputs of inverters 200 and 202 are applied to an OR gate 204, the output 205 from which is coupled to antenna crowbar circuit 12 which is illustrated in greater detail in FIG. 11.

Figure 11:
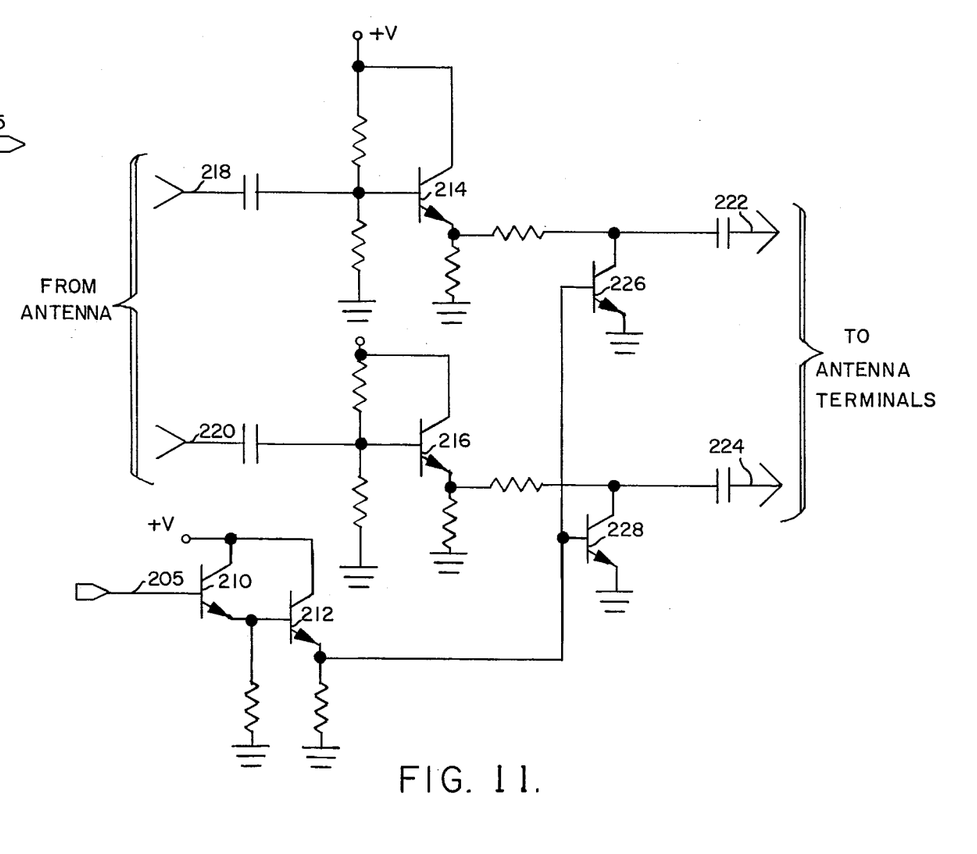
FIG. 11 is a schematic diagram of an antenna crowbar circuit employed in the embodiment of FIG. 1.

The antenna crowbar circuit 12 comprises a pair of cascaded transistors 210 and 212 coupled to the video summer 24. A second pair of transistors 214 and 216 receive signals on lines 218 and 220 from the cable connected to the television antenna. The output of transistors 214 and 216 are coupled to the television antenna terminals of the receiver via lines 222 and 224. A pair of transistors 226 and 228 shunt the lines 222 and 224 when activated, and these are connected to the output of the transistors connecting the video summer to this circuit.

It has, thus, been shown that synchronization signals can be generated externally of the television receiver by a user from the raster generated by an ongoing program being shown on the receiver and these generated signals may be used to provide auxiliary presentations on the screen of the receiver in conjunction with the other programs being shown and in synchronization therewith. The system requires no internal connections to the television receiver. The only connections required are to the antenna, the antenna terminals of the receiver and an optical pick-off attached to the screen.

A typical auxiliary presentation is a clock which displays the time of day on one portion of the T.V. screen. Other auxiliary presentation can be timers, television channel numbers, calculator displays, numerical displays for weather data, such as temperature, humidity, wind, etc., or a video game which is played in conjunction with information from a cooperative station. Thus, it is to be understood that the embodiments disclosed are illustrative only and that many variation and modifications may be made without departing from the principals of the invention herein disclosed and defined by the appended claims.

We claim:

1. Apparatus for generating synchronization signals from an ongoing program received at a television receiver from a TV r.f. signal transmission source, comprising:
    means for generating a substantially white area on the screen of the television receiver;
    means optically coupled to the screen of the television receiver and responsive to a portion of the raster in synchronism with the ongoing program; and
    means coupled to said optically coupled means responsive for generating horizontal and vertical synchronization signals in synchronism with the horizontal and vertical synchronization signals of the ongoing program.

2. Apparatus as defined in claim 1, wherein said means for generating horizontal synchronization signals includes an oscillator phase locked to the portion of the raster to which said optically coupled means is responsive.

3. Apparatus as defined in claim 2, wherein said means for generating horizontal synchronization signals further includes a horizontal video synchronization regeneration circuit coupled to said phase locked oscillator.

4. Apparatus as defined in claim 1, wherein said means for generating vertical synchronizing signals includes an oscillator phase locked to the portion of the raster to which said optically coupled means is responsive.

5. Apparatus as defined in claim 4, further including a pulse stretcher coupling said means responsive and said phase locked oscillator.

6. Apparatus as defined in claim 4, wherein said means for generating vertical synchronization signals further includes a vertical video synchronization regeneration circuit.

7. Apparatus as defined in claim 1, wherein said means for generating a substantially white area includes a white spot generator coupled to said horizontal and vertical phase locked oscillators.

8. Apparatus as defined in claim 7, further including means for varying the size of said substantially white area.

9. Apparatus as defined in claim 8, wherein said size varying means includes means for varying said substantially white area from a large spot to a small unobtrusive spot.

10. Apparatus for overlaying an auxiliary presentation on an ongoing program received by a television receiver from a TV r.f. signal transmission source, comprising:
means for generating a substantially white area on the screen of the television receiver;
means optically coupled to the screen of the television receiver and responsive to a portion of the raster in synchronism with the ongoing program;
means coupled to said optically coupled means responsive for generating horizontal and vertical synchronization signals in synchronism with the horizontal and vertical synchronization signals of the ongoing program; and
means for generating an auxiliary presentation coupled to said means for generating horizontal and vertical synchronization signals.

11. Apparatus as defined in claim 10, further including means for coupling the output of said auxiliary presentation generating means to a television receiver.

12. Apparatus as defined in claim 11, wherein said means for generating a substantially white area includes a white spot generator coupled to said phase locked oscillators.

13. Apparatus as defined in claim 12, further including means for coupling said means for generating a substantially white area to said means for coupling the output of said auxiliary presentation generating means to a television receiver.

* * * * *